Patented Mar. 29, 1932

1,851,652

UNITED STATES PATENT OFFICE

JULIUS SÖLL, OF FRANKFORT-ON-THE-MAIN/SCHWANHEIM, AND FRITZ SCHNELL, OF FRANKFORT-ON-THE-MAIN/GRIESHEIM, GERMANY, ASSIGNORS TO I. G. FARBENINDUSTRIE AKTIENGESELLSCHAFT, OF FRANKFORT-ON-THE-MAIN, GERMANY

PROCESS OF SEPARATING HYDROGEN FLUORIDE FROM SILICON FLUORIDE

No Drawing. Application filed May 28, 1931, Serial No. 540,814, and in Germany January 31, 1928.

The present invention relates to a process of separating gaseous mixtures of hydrogen fluoride and silicon fluoride.

It is known to separate a hydrofluoric acid poor in silicic acid from hydrogen fluoride vapors containing silicon fluoride by cooling these vapors in a refrigerating system to the temperature of the cooling water. Such gas mixtures as mentioned above are, for instance evolved from fluorite containing silicic acid by treating it with sulfuric acid. Owing to the high vapor tension of the hydrogen fluoride, the separation of the hydrogen fluoride from silicon fluoride is very incomplete when being effected according to the above mentioned process; only a small amount of hydrofluoric acid is condensed. The larger part of the hydrofluoric acid goes off together with the non-condensed silicon fluoride vapors. In most cases these gases are, therefore, condensed with water to form a hydrofluoric acid solution containing silicic acid, and this impure hydrofluoric acid ordinarily is treated with silicic acid, in order to convert it into fluosilicic acid. Low temperatures have hitherto not been applied for the separation of hydrofluoric acid from silicon fluoride, because it had to be expected that at low temperatures a high per cent fluosilicic acid would be condensed with and contaminate the hydrofluoric acid.

We have now found that hydrogen fluoride and silicon fluoride can be separated by subjecting a mixture of both gases to a refrigeration below +5° C.; fluosilicic acid being not condensed at these conditions, as only hydrofluoric acid poor in silicic acid, or free from silicic acid, is condensed. It is even possible by cooling the mixture of hydrogen fluoride and silicon fluoride to a suitably low temperature to separate by condensation liquid hydrofluoric acid and to bring the remaining mixture of non-condensed gases to a desired composition. Such a mixture of non-condensed gases of a desired composition may, for instance, be obtained in subjecting the starting gas mixture in a cooling device to a temperature between +5° C. and −5° C., particularly at 0°. When absorbed in water, such gaseous mixtures yield a fluosilicic acid which contains neither free hydrofluoric acid nor precipitated silicic acid because the gaseous mixture is composed of $2HF + SiF_4$. The most suitable cooling temperature is not the same in all cases, but it must be selected for each particular case by a test proof, because the temperature of the uncondensed gases is variable according to the time during which the gas remains in the cooling device and must be adapted to the concentration of the hydrofluoric acid condensed.

By considerably lowering the cooling temperature, for instance to a temperature between −20° C. and −50° C. there can be furthermore attained that the hydrofluoric acid is separated more completely so that the non-condensed part of the gas mixture consists of a more or less pure silicon fluoride gas which can thus be further used.

The process according to the present invention may likewise be carried out if a mixture of hydrogen fluoride and silicon fluoride containing water vapor is used; also a mixture containing air may be treated according to the present process.

Examples

1. The vapors developed by the interaction of sulfuric acid on a silica-containing fluorite and consisting, besides a small quantity of water vapor, of 100 parts (by weight) of fluoride of hydrogen and 13 parts (by weight) of silicon tetrafluoride, are cooled while passing a multitubular surface condenser to a final temperature of 0° C. A hydrofluoric acid of approximately 92% HF-content is condensed, while the uncondensed gases brought into intimate contact with water yield a fluosilicic acid containing neither free hydrofluoric acid nor silicic acid in suspension.

2. Vapors developed and composed as described in the preceding example are cooled to about 40° C. below zero. Hydrofluoric acid containing about 95% of HF is condensed, while the uncondensed vapor consists of $SiF_4$ nearly entirely free from HF, this being shown by its behavior when introduced into water, as 2/3 of the silica is present in the solution in the dissolved state (in the form of $H_2SiF_6$) and ⅔ undissolved (in the form of a hydrate of silica).

We claim:

1. In the process of separating hydrogen fluoride from silicon fluoride the step which comprises subjecting a gas containing hydrogen fluoride and silicon fluoride to a refrigeration below $+5°$ C.

2. In the process of separating hydrogen fluoride from silicon fluoride the step which comprises subjecting a gas containing hydrogen fluoride to a refrigeration between $+5°$ C. and $-50°$ C.

3. In the process of separating hydrogen fluoride from silicon fluoride the steps which comprise subjecting a gas containing hydrogen fluoride and silicon fluoride to a refrigeration between $+5°$ C. and $-5°$ C. and introducing the non condensed part of the gas into water for producing a pure fluosilicic acid.

4. In the process of separating hydrogen fluoride from silicon fluoride the step which comprises subjecting a gas containing hydrogen fluoride and silicon fluoride to a refrigeration between $-20°$ C. and $-50°$ C.

In testimony whereof, we affix our signatures.

JULIUS SÖLL.
FRITZ SCHNELL.